United States Patent
Meyer et al.

(10) Patent No.: US 12,325,195 B2
(45) Date of Patent: Jun. 10, 2025

(54) METHOD FOR PRODUCING A FIBER-COMPOSITE HOLLOW COMPONENT, AND FIBER-COMPOSITE HOLLOW COMPONENT

(71) Applicant: Deutsches Zentrum für Luft-und Raumfahrt e.V., Cologne (DE)

(72) Inventors: Sebastian Meyer, Braunschweig (DE); Martin Hillebrandt, Braunschweig (DE); Christian Hühne, Hannover (DE); Martin Zander, Magdeburg (DE)

(73) Assignee: DEUTSCHES ZENTRUM FÜR LUFT-UND RAUMFAHRT E.V., Cologne (DE)

( * ) Notice: Subject to any disclaimer, the term of this patent is extended or adjusted under 35 U.S.C. 154(b) by 0 days.

(21) Appl. No.: 16/297,877

(22) Filed: Mar. 11, 2019

(65) Prior Publication Data

US 2019/0283339 A1   Sep. 19, 2019

(30) Foreign Application Priority Data

Mar. 13, 2018   (DE) ...................... 10 2018 105 765.2

(51) Int. Cl.
*B29C 65/00*   (2006.01)
*B29C 70/52*   (2006.01)
*B29D 99/00*   (2010.01)

(52) U.S. Cl.
CPC ...... *B29C 66/72141* (2013.01); *B29C 70/521* (2013.01); *B29C 70/526* (2013.01); *B29D 99/0007* (2013.01)

(58) Field of Classification Search
CPC ..... B29C 70/026; B29C 70/028; B29C 70/28; B29C 70/544; B29C 70/40; B29C 70/44;
(Continued)

(56) References Cited

U.S. PATENT DOCUMENTS 3,434,254 A * 3/1969 Rubin ............... H01Q 1/087
  138/119
6,910,304 B2 * 6/2005 Warren .............. B64G 1/222
  52/108
(Continued)

FOREIGN PATENT DOCUMENTS

DE   4023713 A1 * 1/1992 ............ B29C 66/54
DE   603 03 484 T2   10/2006
(Continued)

OTHER PUBLICATIONS

Herbeck, Development and Test of Deployable Ultra-Lightweight CFRP-Booms for a Solar Sale, European Conference on Spacecraft Structures, Materials and Mechanical Testing, Proceedings of the conference held Nov. 29- Dec. 1, 2000 at ESTEC, Noordwijk, The Netherlands. 2001 (accessed Jan. 11, 2020) (Year: 2001).*
(Continued)

*Primary Examiner* — Andrew L Swanson
(74) *Attorney, Agent, or Firm* — WCF IP

(57) ABSTRACT

A method produces a fiber-composite hollow component from a fiber-composite material which contains at least one fibrous material and one matrix material. The fiber-composite hollow component is formed from at least two fiber-composite half-shells which in a joining edge region of the fiber-composite half-shells are joined to one another such that a cavity is configured between the joined-together fiber-composite half-shells.

12 Claims, 2 Drawing Sheets

Figure 1:
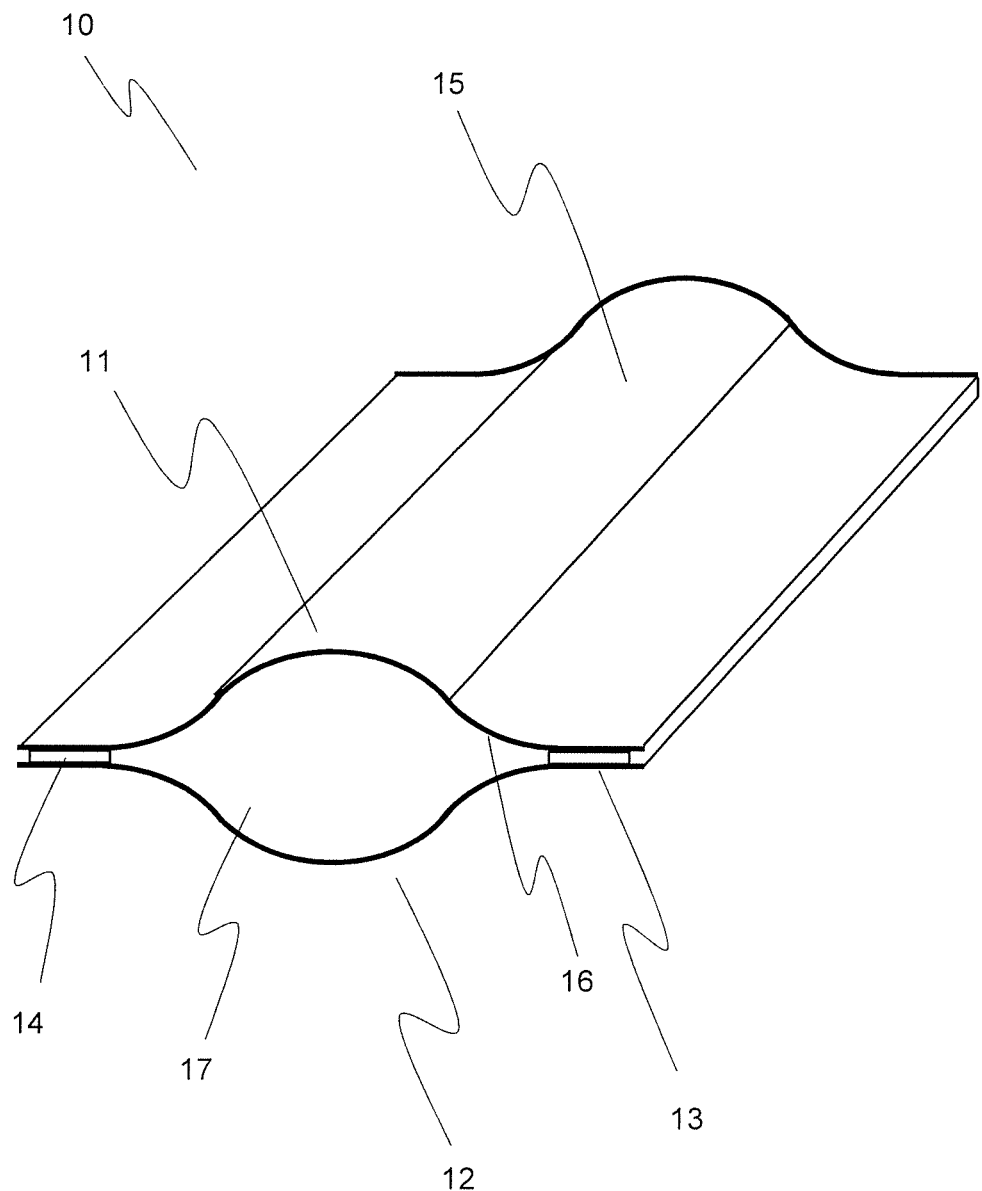

(58) Field of Classification Search
CPC ... B29C 70/443; B29C 70/446; B29C 70/521; B29C 70/526; B29C 66/72141; B29D 99/0007

See application file for complete search history.

(56) References Cited

U.S. PATENT DOCUMENTS

| | | | | |
|---|---|---|---|---|
| 9,352,528 | B1* | 5/2016 | Brooks | G01B 1/00 |
| 9,863,148 | B2* | 1/2018 | Fernandez | B29C 65/48 |
| 2005/0102814 | A1* | 5/2005 | Anderson | B29C 70/543 |
| | | | | 29/455.1 |
| 2014/0230949 | A1* | 8/2014 | Daton-Lovett | F16H 19/064 |
| | | | | 29/896.9 |
| 2016/0348642 | A1* | 12/2016 | Hayden | B29C 70/342 |
| 2017/0274577 | A1* | 9/2017 | Burns | B29C 70/443 |
| 2018/0313083 | A1* | 11/2018 | Murphey | E04C 3/28 |
| 2019/0176407 | A1* | 6/2019 | Blanc | B29C 66/4329 |
| 2019/0232571 | A1* | 8/2019 | Schibsbye | B29D 99/0028 |

FOREIGN PATENT DOCUMENTS

| | | |
|---|---|---|
| DE | 10 2012 109 737 A1 | 4/2014 |
| DE | 10 2016 100 335 B3 | 5/2017 |
| DE | 102018105765 A1 | 9/2019 |
| WO | 2009141235 A2 | 11/2009 |
| WO | 2014/096002 A2 | 6/2014 |

OTHER PUBLICATIONS

Hillebrandt, The Boom Design of the De-Orbit Sail Satellite, Proceedings of the 13th European Conference on Spacecraft Structures, Materials & Environmental Testing, held Apr. 1-4, 2014 in Braunschweig, Germany. ESA-SP vol. 727, ISBN: 978-92-9221-291-9. Edited by L. Ouwehand, 2014, id. 178 (Year: 2014).*

M. Hillebrandt et al., "The Boom Design of the De-Orbit Sail Satellite", European Conference on Spacecraft Structures, Materials and Mechanical Testing, Apr. 2014.

* cited by examiner

METHOD FOR PRODUCING A FIBER-COMPOSITE HOLLOW COMPONENT, AND FIBER-COMPOSITE HOLLOW COMPONENT

The invention relates to a method for producing a fiber-composite hollow component from a fiber-composite material which contains at least one fibrous material and one matrix material. The invention likewise relates to such a fiber-composite hollow component.

Fiber-composite materials can no longer be dispensed with nowadays in the modern aviation and space industry. By virtue of the weight-specific strength and rigidity of fiber-composite components, the latter produced from a fiber-composite material are particularly suitable for light-weight construction, wherein system-critical structures are also producible from fiber-composite materials.

In the production of a fiber-composite component from a fiber-composite material, a matrix material embedded in the fibrous material is typically cured in most instances by an impingement with temperature such that the fibrous material, conjointly with the cured matrix material, forms an integral unit. The reinforcement fibers contained in the fibrous material, by way of the cured matrix material, are thus forced into the predefined orientation of said reinforcement fibers in order for the envisaged forces to be able to be absorbed by the component in a corresponding manner.

When a fiber-composite component is to be assembled from a plurality of part-elements, there are two substantial procedures to this end. On the one hand, the two part-elements can be produced separately in that the matrix material of the parts is cured in a corresponding manner. The part-elements are subsequently joined with the aid of a joining method, wherein the two part-elements in the region of the joints have to be connected to one another with the aid of various joining methods. This sets corresponding requirements for the respective joining method chosen, such as adhesive bonding, for example. The so-called co-curing method in which the part-elements are joined in a non-cured state and are then conjointly cured represents another method. This has the advantage that the component and the joint are produced in a common process step, on account of which the joints in terms of the adhesive joining method are of a particularly high quality. However, the co-curing method sets particular requirements for the preforming step for producing the individual part-preforms, such that the respective production method in this respect has to be chosen against the background of the respective parameters set for the component.

In the aerospace industry, roll-up capable masts from thin-walled fiber-composite shells are frequently used in the most varied missions by virtue of the volumetric efficiency and stowage and the low mass-to-unfolded-length ratio of said roll-up capable masts. The roll-up capable shell masts herein are subdivided into masts having an open and a closed cross section, wherein the masts having a closed cross section offer a torsional rigidity that is advantageously higher.

Very high requirements in terms of the manufacturing precision are set for the manufacturing of roll-up capable shell masts, this specifically applying to roll-up capable shell masts having a closed cross section. In practice, roll-up capable shell masts are currently produced in a plurality of manufacturing steps. Two half-shells from a fiber-composite material are first made, said two half-shells in a further manufacturing step being joined so as to form a closed profile, in most instances by adhesive bonding on the external wing edge regions of said half-shells. This joining process represents a particular challenge since the two half-shells have to be exactly mutually aligned and the joining has to be carried out in a very exact manner so as to guarantee the roll-up capability and the dimensional accuracy. The joining process thus increases the complexity and the duration of the manufacturing, and represents a risk in terms of the manufacturing success in that the strength of the joint is compromised by local faulty spots, or the roll-up capability is no longer provided on account of an imprecise positioning of the shells, respectively. The shells, in particular in the case of fiber-composite materials as the masts material, are joined by an adhesive, the uniform processing thereof in terms of a homogenous layer thickness and contact face being at risk on account of the manual application. Moreover, the adhesives, by virtue of the high requirements set for the temperature application range, the elongation at break, and the shear strength as well as the gas emission behavior, are often imitating.

Roll-up capable shell masts from a fiber-composite material are known from Hillebrandt, M.; Meyer, S.; Zander, M.; Straubel, M.; Hühne, C.: "The boom design of the de-orbit sails satellite" in: European Conference of Space Script structures, materials and mechanical testing, 1-Apr. 4, 2014, Braunschweig, Germany, wherein it is proposed in this research paper that roll-up capable shell masts of this type for satellite applications are produced in a co-curing method. The curing of the individual half-shells and the joining herein are carried out in a common process step.

However, it has been demonstrated that a central issue in the integral manufacturing of shell masts from double-omega-shaped fiber-composite half-shells lies in that the radii that converge at the flanges do not enable any clear delimitation of the joint since the radii converge toward one another in a tangential manner. When joining the half-shells by adhesives, as well as in the case of conventional integral manufacturing, there is herein the issue that adhesive or resin accumulations can be created in this tangentially converging region (gusset region). However, in order for the masts to be rolled up, the latter have to be compressed so as to form a flat strip, wherein resin accumulations would lead to local damage to the half-shells in this process.

From DE 10 2012 109 737 A1 it is known for gusset cavities of this type to be occupied by way of an elastomer material with the aid of an elastomeric gusset, so as to avoid resin accumulations in said regions. However, such an elastomeric gusset is not suitable for roll-up capable shell masts for the simple reason that then the rolling-up and the compressing so as to form a flat strip would no longer be possible without damage.

A method and a device for producing a fibrous gusset, and a method and system for producing such a fibrous gusset are furthermore known from DE 10 2016 100 335 B3, wherein such a fibrous gusset is likewise to replace cavities in a gusset region described. However, this would in principle lead to such a gusset region pertaining excessive rigidity since the matrix material also is introduced into said region occupied by the fibrous gusset and thus, conjointly with the fibrous gusset, forms an integral unit. This would also ultimately significantly impede the roll-up capability and the compressing to form a flat strip, or lead to local damage in the flat-pressed gusset region.

It is therefore an object of the present invention to specify an improved method for producing such a roll-up capable shell mast from a fiber-composite material, in which the issue of resin accumulations in the region of the converging half-shells can be avoided or entirely eliminated.

The object is achieved according to the invention by the method according to claim 1. Advantageous design embodiments of the method are to be found in the respective dependent claims.

According to claim 1 a method for producing a fiber-composite hollow component from a fiber-composite material is proposed, wherein the fiber-composite material contains at least one fibrous material and one matrix material. The fiber-composite material thus has two substantial component parts, specifically the fibrous material, on the one hand, and the matrix material, on the other hand. Depending on the requirement profile for the fiber-composite hollow component, it can also be required that the fiber-composite material has dissimilar fibrous materials which are provided at different locations or positions, respectively, of the component. Accordingly, neither the term fibrous material nor matrix material is limiting in terms of substantiation.

The fiber-composite hollow component herein is formed in a generic manner from at least two fiber-composite half-shells which in an adjoining edge region of the fiber-composite half-shells are connected to one another such that a cavity is configured between the joint-together fiber-composite half-shells. Fiber-composite hollow components of this type are suitable for use as shell masts, in particular thin-walled shell masts, and in particular as the roll-up capable shell masts.

First, the fiber-composite half-shells that are formed from a fibrous material of the fiber-composite material are provided, wherein specifically a first fiber-composite half-shell which has been formed from the fibrous material of the fiber-composite material, and at least one second fiber-composite half-shell which likewise has been formed from a fibrous material of the fiber-composite material, are provided. It is conceivable and also comprised by the method that a plurality of half-shells for the entire component are made available, for example when said component is an elongate fiber-composite hollow component which is assembled from a plurality of part-segments.

The fiber-composite half-shells provided herein are provided such that said fiber-composite half-shells are not yet cured. In other words, the fibrous material of the fiber-composite half-shells is either not yet soaked with a matrix material (dry fibrous semi-finished products) or is already pre-impregnated with a matrix material (prepregs), wherein the matrix material of the pre-impregnated prepregs is indeed not yet (fully) cured or cross-linked, respectively. In other words, the fiber-composite half-shell provided from the fibrous material of the fiber-composite material are preforms in which the matrix material embedding the fibrous material has yet to be cured in a curing process step. Nevertheless, it is conceivable that the preforms with the aid of an applied binding agent to have a certain dimensional stability such that the fiber-composite half-shells brought into shape can also be further processed in a corresponding constructive manner. However, this does not in principle deny the proposed co-curing method its generic basis for the method according to the invention.

In the next step, the two fiber-composite half-shells are now assembled so as to form a fiber-composite hollow component, wherein to this end the two half-shells are joined to one another by way of the joining edge regions thereof. It is provided according to the invention herein that at least one space element is inserted in the joining edge region between the first fiber-composite half-shell and the at least second fiber-composite half-shell such that the half-shells have a defined mutual spacing. Such a spacer element herein can preferably be composed of the same fibrous material as the fibrous material of the half-shells. However, it is also conceivable that another material is used therefor. Adhesive films having a defined thickness or pasty adhesives having particles are thus also conceivable as spacer elements. It is essential that a defined thickness of the joints is achieved with the aid of the spacer elements.

The spacer element which is inserted in the joining edge regions between the half-shells thus becomes a component part of the joint in that the two half-shells are connected to one another, wherein the half-shells with the aid of the spacer element are not connected directly to one another but in each case by way of the spacer element placed therebetween. The first fiber-composite half-shell in terms of process technology is thus joined to a first side of the spacer element, while the second fiber-composite half-shell is joined to the opposite second side of the respective spacer element.

Furthermore, an internal vacuum cover is incorporated in the cavity formed by the assembling of the fiber-composite half-shells, wherein the assembled fiber-composite half-shells in turn are incorporated in an external vacuum cover such that a component cavity having the fibrous material of the fiber-composite hollow component to be produced is formed between the internal vacuum cover and the external vacuum cover. Said internal component cavity herein is sealed, or tightly sealed, respectively, in a vacuum-tight manner with the aid of the external and internal vacuum cover such that said component cavity can be evacuated with the aid of a vacuum pump. The incorporation of the internal vacuum cover herein can be incorporated either after the assembling of the two half-shells in that the internal vacuum cover is incorporated in the cavity formed by the assembling of the half-shells. However, it is also conceivable that the internal vacuum cover, for example in the form of a vacuum bag or a vacuum tube, is first placed in one of the half-shells and the component is subsequently assembled such that the assembling of the half-shells and the incorporation of the internal vacuum cover are performed more or less in one process step.

Once the internal vacuum cover and the external vacuum cover in a corresponding manner seals the formed component cavity having the fibrous material, the component cavity having the fibrous material is evacuated by means of a vacuum pump. Depending on the semi-finished product used, an infusion process can optionally follow now, in which a matrix material is infused into the evacuated fibrous material, so as to soak the fibrous material of the component with the matrix material in a corresponding manner. By contrast, when pre-impregnated fibrous semi-finished products, that is to say prepregs, are used, it is thus conceivable for this infusion step to be dispensed with.

The matrix material embedded in the fibrous material in the component cavity is finally cured, for example by a corresponding impingement with temperature and by temperature-controlling the respective construction.

On account of the use of the spacer elements in the joining edge regions of the half-shells it can be achieved that the gusset configured in the cavity is broken up in this region, on account of which the internal vacuum cover bears completely on the internal wall of the fiber-composite hollow component to be produced. Corresponding resin accumulations or resin residues which later impede or render almost impossible any rolling-up and compressing of the component, for example, can thus be avoided in this gusset region in the production of the hollow component.

It has been demonstrated herein that this approach is particularly advantageous in the case of double-omegashaped components which are in each case formed from two omega-shaped half-shells. The radii at the joints herein no longer converge in a tangential manner but are interrupted by the spacer element which generates a defined mutual spacing of the half-shells, on the one hand, and also forms part of the internal wall of the hollow component. On account thereof, the internal vacuum cover can uniformly hug the internal wall of the hollow component without gaps being created or respective gusset regions, as are known in the case of components of this type from the prior art, being configured herein.

The inventors have recognized herein that the issue with the resin accumulations in the case of hollow components and correspondingly used internal vacuum covers can be solved by using the spacer elements, without the mechanical properties of the component being compromised on account thereof. The inventors have in particular recognized that, despite the spacer elements used, compressing the finished hollow component is possible as before, and rolling-up of the compressed hollow component can be carried out as before. Fiber-composite hollow components of this type are therefore particularly suitable as roll-up capable shell masts which can be used in satellites or other aerospace-related objects and offer a corresponding contribution toward lightweight construction.

As has already been discussed, it is particularly advantageous when a double-omega-shaped hollow component which is formed from two omega-shaped half-shells is produced with the aid of the method. Such an omega-shaped half-shell herein has a convexly curved primary shell region, the joining edge regions adjoining in each case by way of concavely curved transition regions at two opposite sides. The terms convex and concave herein refer to the external side of the component. When assembling these half-shells thus formed, the concavely curved transition regions converge toward one another, on account of which an arbitrary undesirable gusset region would result in the normal case. Said mutual convergence within the transition regions can be interrupted by inserting the spacer elements here, on account of which the undesirable gusset regions can be avoided.

As has already been discussed, it is advantageous when the spacer element is formed from a fibrous material of a fiber-composite material. The spacer element is advantageously formed from the same fibrous material from which the half-shells are also formed. However, it is also conceivable that another material, which is suitable for the joint and the respective parameters, is used here.

The component per se as well as the joint herein are cured in a common process step such that an integral component results. Integral herein means that there is no subsequent joining of the half-shells, but that the joint is established by adhesive bonding conjointly with the curing of the component.

In one further advantageous embodiment at least one of the fiber-composite half-shells is provided by incorporating the fibrous material in a molding tool. It is conceivable herein that the non-draped fibrous material is placed in the molding tool and is thus brought to the corresponding shape of the respective half-shell such that the corresponding later half-shell geometry results on account of the shape-imparting tool surface of the molding tool. In one further advantageous embodiment it is furthermore conceivable that both half-shells are provided by incorporating the fibrous material in a molding tool, wherein the first fiber-composite half-shell is provided in a first molding-tool half of the molding tool, and the second fiber-composite half-shell is provided by incorporating the fibrous material in a second molding-tool half of the molding tool. The spacer elements in the joint region are subsequently placed on the fibrous material of the first fiber-composite half-shell and/or of the second fiber-composite half-shell such that the spacer element is then subsequently inserted in the joint region between the two half-shells by closing the two molding-tool halves.

The internal vacuum cover can be placed in one of the cavities of the half-shells either herein or before the assembling of the two tool halves, wherein the tool halves are then subsequently assembled and the internal vacuum cover is finally incorporated in the cavity of the component. The two half-shells are joined to one another in a corresponding manner herein in the region of the joints or joining edge regions, respectively, by the assembling of the tool halves.

However, it is also conceivable that the molding-tool halves are first assembled, on account of which the two half-shells are connected to one another in the joining edge regions thereof (said two half-shells at least contacting one another by way of the spacer elements), wherein the internal vacuum cover is subsequently inserted in the cavity which is formed by the assembling of the molding-tool halves. To this end, it is necessary that at least one side of the molding tool has an opening in such a manner that the internal vacuum cover can be inserted to this end.

In terms of the entire method according to the invention it is moreover necessary that the fiber-composite hollow component to be produced on at least one side has an opening from which the internal vacuum cover can then be guided out of the cavity such that the component cavity that is formed conjointly with the external vacuum cover is correspondingly sealed and evacuatable.

To this end, in one advantageous embodiment, the internal vacuum cover is sealed in a vacuum-tight manner in relation to the molding tool, wherein the external vacuum cover is formed by the closed molding tool. The external vacuum cover is thus the closed molding tool, wherein the internal vacuum cover herein in relation to the molding tool is sealed such that the component cavity between the molding tool and the internal vacuum cover is closed in a vacuum-tight manner and can thus be evacuated with the aid of the vacuum pump.

To this end, in one alternative embodiment, the closed molding tool is incorporated in the external vacuum cover and conjointly with the internal vacuum cover is sealed in a vacuum-tight manner such that the closed component cavity is formed between the internal vacuum cover and the external vacuum cover. The external vacuum cover herein is, for example, a bag-shaped or tubular vacuum cover into which the molding tool can be moved. The internal vacuum cover guided out of the molding tool by way of the external vacuum cover is then sealed such that the component cavity is then formed between the internal and the external vacuum cover. The molding tool herein, in this embodiment, is a component part of the component cavity and remains therein, and in the evacuation of the component cavity is to this extent conjointly evacuated in a corresponding manner.

The internal vacuum cover herein, delimits the component cavity formed with the aid of the external vacuum cover in relation to an external region such that the component cavity is evacuatable in a corresponding manner. It is advantageous herein when the external region in relation to an atmospheric pressure is impinged with a positive pressure, on account of which the internal vacuum cover in particular is more intensely pressed against the fibrous material incorporated in the component cavity. By virtue of the fact that the internal vacuum cover is disposed in the interior of the component to be produced, it is moreover conceivable and also advantageous when the internal vacuum cover is closed in an end region such that a cavity which was previously part of the external region is formed. The internal vacuum cover is thus provided between said cavity and the component cavity. Said cavity can now be impinged with a positive pressure so as to press the internal vacuum cover even more intensely against the fibrous material incorporated in the component cavity, without the entire external region being completely impinged with a positive pressure herein. The incorporation of the entire component in an autoclave can be dispensed with in this design embodiment.

The object is moreover also achieved according to the invention by a fiber-composite hollow component according to claim 10, wherein such a fiber-composite hollow component is produced by the method described above. Such a fiber-composite hollow component herein can be a shell mast which is in particular roll-up capable.

It is also an aspect of the invention herein that a fiber-composite hollow component which is produced in such a manner and which is in particular elongate and mast-shaped, is used as a roll-up capable mast.

Figure 2:
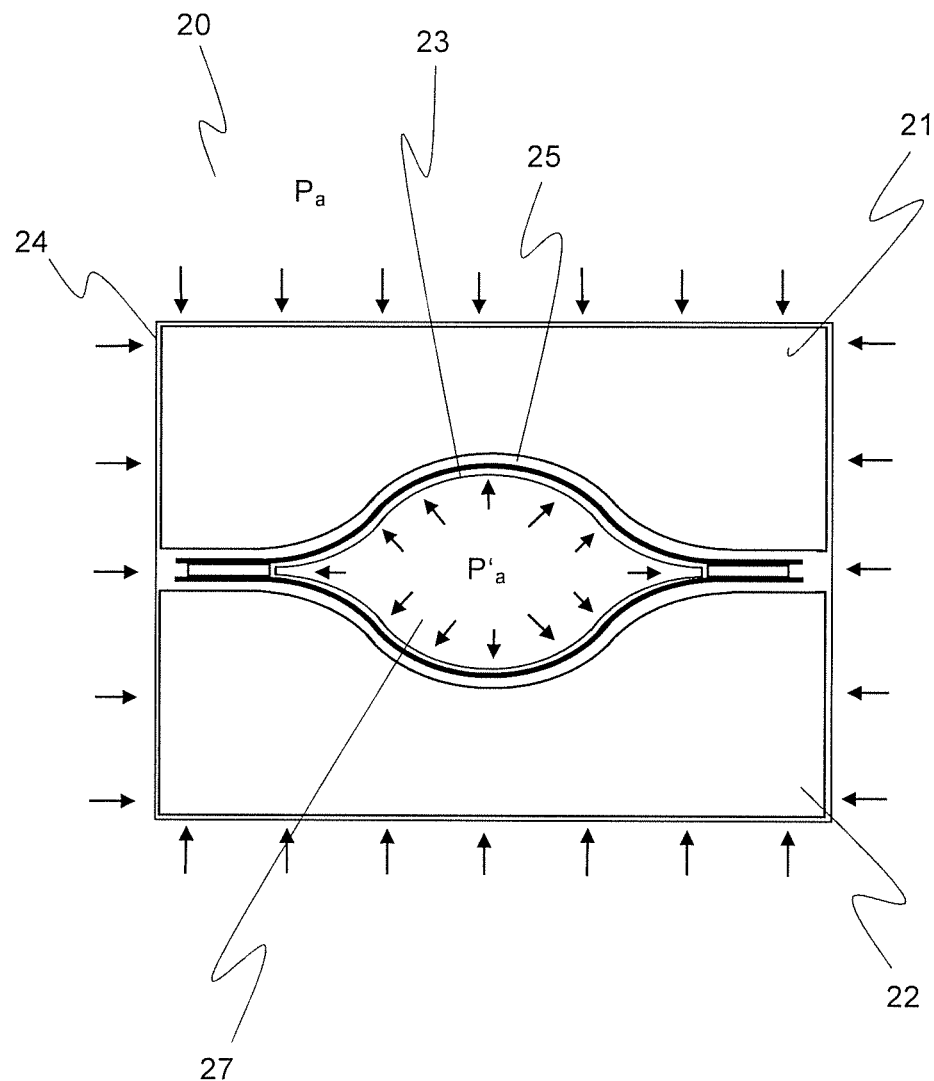

The invention will be explained in an exemplary manner by means of the appended figures in which:

FIG. 1 shows a schematic cross-sectional illustration of a roll-up capable shell mast; and FIG. 2 shows a schematic cross-sectional illustration in the production of such a shell mast with the aid of a molding tool.

FIG. 1 schematically shows the shell mast 10 which is produced from a fiber-composite material having fibrous material and matrix material. The shell mast 10 herein is produced from a first fiber-composite half-shell 11 and from a second fiber-composite half-shell 12. The two half-shells herein are joined to one another and herein produced in a single process step which includes the curing of the matrix material of the half-shells 11 and 12 as well as of the joint.

The fiber-composite half-shells 11 and 12 in the peripheral regions thereof have in each case joining edge regions 13 in which the first fiber-composite half-shell 11 is joined to the second fiber-composite half-shell 12. To this end, a spacer element 14 is in each case situated in the joining edge region 13 between the first fiber-composite half-shell 11 and the second fiber-composite half-shell 12, on account of which the first half-shell 11 is held in a defined manner at a predefined spacing from the second half-shell 12.

The half-shells 11 and 12 have in each case one convexly curved primary shell region 15 which on both sides of the cross section in each case are joined by a concavely curved transition region 16 which finally opens into the joint region 13. On account of the spacer element 14 it is prevented herein that the transition regions 16 of the first half-shell 11 and the transition region 16 of the second half-shell 12 converge in the common joint region 13 and a sharp gusset region which facilitates resin accumulations is thus formed. Rather, this tangential convergence of the transition regions 16 is interrupted by the spacer element 14, on account of which respective gusset regions are avoided.

FIG. 2 shows the production of such a shell mast 10, known from FIG. 1, with the aid of a molding tool 20. The molding tool 20 herein has a first molding-tool half 21 and a second molding-tool half 22 which in each case has a respective shape-imparting tool surface in such a manner that a corresponding half-shell 11 and 12 can be produced with the aid of each molding-tool half 21 and 22.

The molding tool 20 herein is configured such that said molding tool 20 can be transferred from an open state to a closed state, wherein fibrous material is first incorporated in the opened molding-tool halves 21 and 22 in the open state. The respective half-shell 11 and 12 is formed on account of the incorporation of the fibrous materials.

The spacer element 14 is subsequently placed on the first and/or the second half-shell such that the molding-tool halves 21 and 22 can thereafter be closed. In the closing of the molding-tool halves, the half-shells 11 and 12 contact one another in the joint region in the respective molding-tool halves, specifically by way of the spacer element 14 that is incorporated therein.

Before closing, or after closing, an internal vacuum cover 23 is incorporated in the formed cavity 17 of the shell mast 10 herein such that the internal wall of the cavity 17 is covered by such an internal vacuum cover 23. The entire molding tool 20, having the closed molding-tool halves 21 and 22 thereof, is thereafter incorporated in an external vacuum cover 24, wherein the internal vacuum cover 23 and the external vacuum cover 24 are then mutually sealed such that a vacuum-tight component cavity 25 is created between the internal vacuum cover 23 and the external vacuum cover 24.

On account of the evacuation of the component cavity 25, the molding tool and the molding-tool halves 21 and 22 thereof are compressed by virtue of the external environmental pressure, for example the atmospheric pressure $P_a$, or of a positive pressure, while the half-shells 11 and 12 are pushed from the inside against this shape-imparting tool surface of the respective molding-tool halves. This is indicated by the respective arrows.

As can be seen in the enlargement of the gusset region, the internal vacuum cover herein not only hugs the first half-shell 11 and the second half-shell 12 from the inside, but also hugs the end side of the spacer element 14, such that any gusset formation is avoided in this region. No resin accumulations can thus be created in said regions when a matrix material is infused into the dry fibrous material, or no resins or matrix material, respectively, can leak at this location when the component is evacuated. A shell mast which has defined spacing and which avoids resin accumulations in small micro-cavities of this type is thus ultimately created.

On account of the internal vacuum cover 23 and the external vacuum cover 24, the component cavity 25 is delimited from an external region 26 such that the component cavity 25 is evacuatable. The interior cavity 27 formed by the internal vacuum cover 23 herein can also be a component part of the external region 26.

By contrast, said interior cavity of the internal vacuum cover 23 in the exemplary embodiment of FIG. 2 is closed such that said interior cavity is capable of being impinged with an additional pressure. This pressure is identified as $P'_a$ and is higher than the pressure $P_a$. It can be achieved on account thereof that the internal vacuum cover 23 is correspondingly pressed against the fibrous material of the half-shells 11 and 12 that is incorporated in the component cavity 25 in a correspondingly more intense manner than under the normal atmospheric pressure.

The method according to the invention is thus suitable for the production of double-omega-shaped shell masts which are in particular intended to be roll-up capable. Shell masts produced by said method are thus particularly suitable for aerospace structures that are capable of unfolding, inter alia solar sails, photovoltaics applications that are capable of unfolding, antennae, instrument masts, de-orbit sails, etc.

LIST OF REFERENCE SIGNS

10—Shell mast
11—First fiber-composite half-shell
12—Second fiber-composite half-shell
13—Joint region
14—Spacer element
15—Convexly curved primary shell region
16—Concavely curved transition region
17—Cavity
20—Molding tool
21—First molding-tool half
22—Second molding-tool half
23—Internal vacuum cover
24—External vacuum cover
25—Component cavity
26—External region
27—Interior cavity of the internal vacuum cover
$P_a$—Atmospheric pressure
$P'_a$—Positive pressure

The invention claimed is:

1. A method for producing a fiber-composite hollow component from a fiber-composite material which contains at least one fibrous material and one matrix material, wherein the fiber-composite hollow component is formed from at least two fiber-composite half-shells which are joined to one another in joining edge regions of each of the two fiber-composite half-shells such that a cavity is configured between the two fiber-composite half-shells when they are joined together, comprising:
   providing a first fiber-composite half-shell and at least one second fiber-composite half-shell, each of which are formed from the fiber-composite material;
   assembling the first fiber-composite half-shell and the at least second fiber-composite half-shell so as to form the fiber-composite hollow component wherein at least one spacer element is inserted in each joining edge region between the first fiber-composite half-shell and the at least one second fiber-composite half-shell to generate a defined mutual spacing of the half-shells and to form a part of an inner wall of the fiber-composite hollow component, so that at a joining region radii of the half-shells do not converge in a tangential manner but are interrupted by the at least one spacer element, wherein the spacer element does not extend into the cavity;
   incorporating an internal vacuum cover in the cavity of the fiber-composite hollow component formed by the assembling step, and incorporating the fiber-composite hollow component formed by the assembling step in an external vacuum cover such that a component cavity having the fibrous material of the fiber-composite hollow component to be produced is formed between an internal vacuum cover and the external vacuum cover;
   evacuating the component cavity having the fibrous material such that the internal vacuum cover not only hugs the first fiber-composite half-shell and the second fiber-composite half-shell from the inside but also hugs an end side of the spacer element; and
   curing the matrix material which embeds the fibrous material of the fiber-composite half-shells to produce a roll-up hollow body in which at a joining region radii of the half-shells do not converge in a tangential manner but are interrupted by the at least one spacer element.

2. The method of claim 1 wherein each of the fiber-composite half-shells provided in the providing step have a convexly curved primary shell region such that a concavely curved transition region is formed at by the joining edge regions on two opposite sides.

3. The method of claim 1 wherein the at least one spacer element is/are formed from a fibrous material of a fiber-composite material and the at least one spacer element is/are inserted in the joining edge region, wherein the matrix material embedding the fibrous material of the fiber-composite half-shells and the fibrous material of the at least one spacer element is cured in one process step.

4. The method of claim 1 wherein at least one of the fiber-composite half-shells is provided by incorporating the fibrous material in a molding tool.

5. The method of claim 1
   wherein the first fiber-composite half-shell is provided by incorporating the fibrous material in a first molding-tool half of a molding tool, and the at least one second fiber-composite half-shell is provided by incorporating the fibrous material in a second molding-tool half of the molding tool;
   wherein the at least one spacer element in the joint regions is/are subsequently deposited on the fibrous material of the first fiber-composite half-shell in the first molding-tool half, and/or on the fibrous material of the second fiber-composite half-shell in the second molding-tool half; and
   wherein the first molding tool half and the second molding tool half are subsequently closed such that the first fiber-composite half-shell and the at least one second fiber-composite half-shell are connected to one another by way of the at least one spacer element.

6. The method of claim 5, wherein the internal vacuum cover is sealed in a vacuum-tight manner in relation to the molding tool, and wherein the external vacuum cover is formed by the molding tool when closed.

7. The method of claim 5 wherein the molding tool, when closed, is incorporated in the external vacuum cover and, with the internal vacuum cover, is sealed in a vacuum-tight manner such that the component cavity is formed between the internal vacuum cover and the external vacuum cover.

8. The method according to claim 1 wherein a shell mast is produced as the fiber-composite hollow component.

9. The method according to claim 1, wherein the internal vacuum cover delimits the component cavity in relation to an external region, and wherein the external region in relation to an ambient pressure is impinged with a positive pressure.

10. The method according to claim 1, wherein the spacer element does not cover parts of the half-shells which form inner walls of the fiber-composite hollow body.

11. The method according to claim 1, wherein each joining edge region in which the at least one spacer element is inserted extends longitudinally.

12. A method for producing a fiber-composite hollow component from a fiber-composite material which contains at least one fibrous material and one matrix material, wherein the fiber-composite hollow component is formed from at least two fiber-composite half-shells which are joined to one another in joining edge regions of each of the two fiber-composite half-shells such that a cavity is configured between the two fiber-composite half-shells when they are joined together, comprising:

providing a first fiber-composite half-shell and at least one second fiber-composite half-shell, each of which are formed from the fiber-composite material;

assembling the first fiber-composite half-shell and the at least second fiber-composite half-shell so as to form the fiber-composite hollow component wherein at least one spacer element is inserted in each joining edge region between the first fiber-composite half-shell and the at least one second fiber-composite half-shell to generate a defined mutual spacing of the half-shells and to form a part of an inner wall of the fiber-composite hollow component, so that at a joining region radii of the half-shells do not converge in a tangential manner but are interrupted by the at least one spacer element, wherein the spacer element does not extend into the cavity;

incorporating an internal vacuum cover in the cavity of the fiber-composite hollow component formed by the assembling step, and incorporating the fiber-composite hollow component formed by the assembling step in an external vacuum cover such that a component cavity having the fibrous material of the fiber-composite hollow component to be produced is formed between an internal vacuum cover and the external vacuum cover;

evacuating the component cavity having the fibrous material such that the internal vacuum cover bears completely on an internal wall of the fiber-composite hollow component to be produced including an end side of the spacer element; and curing the matrix material which embeds the fibrous material of the fiber-composite half-shells to produce a roll-up hollow body in which at a joining region radii of the half-shells do not converge in a tangential manner but are interrupted by the at least one spacer element.

\* \* \* \* \*